US005752016A

United States Patent [19]
Whittaker et al.

[11] Patent Number: 5,752,016

[45] Date of Patent: May 12, 1998

[54] METHOD AND APPARATUS FOR DATABASE INTERROGATION USING A USER-DEFINED TABLE

[75] Inventors: Stephen Whittaker, Bristol; Keith Harrison, Gwent; Philip Stenton, Gloucestershire, all of Great Britain; Derek Proudian, Moss Beach, Calif.; Nicholas Haddock, Bristol, Great Britain

[73] Assignee: Hewlett-Packard Company, Palo Alto, Calif.

[21] Appl. No.: 428,397

[22] Filed: Apr. 25, 1995

Related U.S. Application Data

[63] Continuation of Ser. No. 761,961, Mar. 30, 1992, abandoned.

[30] Foreign Application Priority Data

| Feb. 8, 1990 | [GB] | United Kingdom | 9002874 |
| Feb. 8, 1990 | [GB] | United Kingdom | 9002876 |
| Jan. 3, 1991 | [GB] | United Kingdom | 9002876 |

[51] Int. Cl.$^6$ ............................................ G06F 17/30
[52] U.S. Cl. .................. 395/600; 3955/155; 3955/160; 364/DIG. 1; 364/282.1; 364/283.2; 364/229.41
[58] Field of Search ................... 395/600, 155, 395/160; 364/DIG. 1, DIG. 2

[56] References Cited

U.S. PATENT DOCUMENTS

| T944,002 | 3/1976 | Woodrum | 444/1 |
| 4,086,628 | 4/1978 | Woodrum | 395/600 |
| 4,506,326 | 3/1985 | Shau | 395/700 |
| 4,506,343 | 3/1985 | Shipp, Jr. et al. | 364/900 |
| 4,606,002 | 8/1986 | Waisman et al. | 364/200 |
| 4,661,904 | 4/1987 | Kurakake et al. | 395/375 |
| 4,868,733 | 9/1989 | Fujisawa et al. | 364/200 |
| 5,115,504 | 5/1992 | Belove et al. | 395/600 |
| 5,272,628 | 12/1993 | Koss | 364/419.19 |
| 5,305,208 | 4/1994 | Doi et al. | 364/419.19 |

FOREIGN PATENT DOCUMENTS

| 0 066 052 | 12/1982 | European Pat. Off. . |
| 0 124 097 A2 | 11/1984 | European Pat. Off. . |
| 0 249 961 | 12/1987 | European Pat. Off. . |

OTHER PUBLICATIONS

Ozsoyoglu et al., "Query Processing techniques in the summary–table–by–example database query language", pp. 526–573 Dec. 1889, ACM Transactions on Database Systems vol. 14, No. 4.

Zloof, "QBE/OBE: A language for office and business automation", pp. 13–21 May 1981.

Wu, "Glad: Graphics language for database", pp. 164–170 Oct., 1987.

Tansel et al. "Time–by–Example Query Language for Historic al Databases", pp. 464–478 Apr., 1989.

Moshé M. Zloof, "QBE/OBE: A Language For Office & Business Automation," IEEE Computer Graphics and Applications, vol. 14, No. 5, May 1981.

Gultekin Özsoyoglu et al., "Query Processing Techniques in the Summary–Table–by–Example Database Query Language," ACM Transactions on Database Systems, vol. 14, No. 4, Dec. 1989.

Lawrence A. Rowe et al., "A Visual Shell Interface to a Database," Software Practice and Experience, vol. 19, No. 5, Jun. 1989.

(List continued on next page.)

*Primary Examiner*—Thomas G. Black
*Assistant Examiner*—Jean R. Homere

[57] ABSTRACT

A graphical method of interrogating a computer database is provided, the database having a number of records and a number of dimensions in which each record is represented, the dimensions including headings and the method comprising providing a blank elementary select table, adding user-determined row and column headings and executing a program which fills in the cells with data corresponding to the set intersections of the row and column headings.

25 Claims, 9 Drawing Sheets

OTHER PUBLICATIONS

C.T. Wu, "GLAD: Graphics Languate For Database," IEEE Computer Software and Applications Conference, COMPSAC 87, 7–9 Oct. 1987, Tokyo, Japan.

H. -J. Kim et al., "Picasso: A Graphical Query Language," Software, vol. 18, No. 3, pp. 169–203, 1988.

M.E. Senko, "Foral LP–Making Pointed Queries with a Light Pen," Proceedings IFIP Congress, 8–12 Aug. 1977, Toronto, IFIP, North–Holland Publ. Co., p. 635–640, 1977.

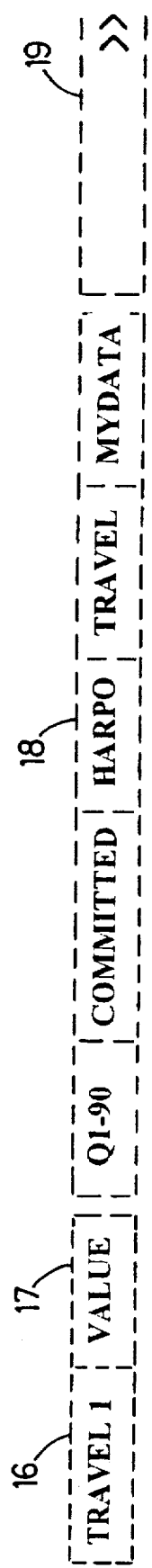
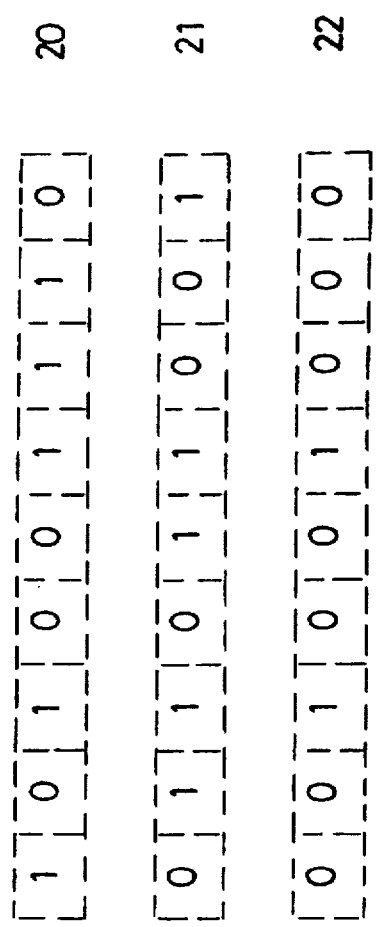
Fig. 5
Fig. 6

| | AIM |
|---|---|
| TRAVEL | 64.7 |

Fig. 7

| AIM | | | |
|---|---|---|---|
| TRAVEL | | | |
| FY-91 | | | |
| Q1-91 | Q2-91 | Q3-91 | Q4-91 |
| 7.8 | 22.1 | 16.7 | 18.1 |

Fig. 8

METHOD AND APPARATUS FOR DATABASE INTERROGATION USING A USER-DEFINED TABLE

This is a continuation of application Ser. No. 07/761,961, filed Mar. 30, 1992 and now abandoned.

The invention relates to a method and apparatus for graphical interrogation of a database. The implementation of mouse-driven computer applications in a windows environment has materially simplified the general use of computers. Facility with a keyboard and knowledge of computer languages are no longer necessary. These benefits are felt particularly at managerial level and here it is important to be able to derive database information for monitoring and decision making purposes. Formulation of queries is an important managerial function.

BACKGROUND OF THE INVENTION

Database interrogation depends heavily on the logical formulation of queries and special text-based languages have been developed as a consequence. An alternative graphical system of interrogation is desirable. A graphical interrogation technique is described in the paper "Query by Example", Proceedings of the National Computer Conference 1975 by M. M. Zloof. Here queries are formulated by filling in a table corresponding to a given relation in a relational database. Fixed and exemplary elements are distinguished in the table and a further output table is derived which displays the intersection or the union of the sets entered. This system suffers from two major disadvantages. Firstly, the tabular format of the queries is dictated by the established relation tables of the database and secondly the formulation of the query requires expertise in logic.

SUMMARY OF THE INVENTION

An object of the present invention is to provide a simple to use free format query facility in graphical form.

According to one aspect of the invention there is provided a method of interrogation of a computer database, the database having a number of records and a number of dimensions in which each record is represented, the dimensions including headings and the method comprising providing a blank elementary select table, adding user-determined row and column headings for the table from those available in the dimensions, thereby defining rows and columns and empty cells at the crossings of the rows and columns, and executing a program which fills in the cells with data corresponding to the set intersections of the row and column headings.

Preferably there are provided further steps of adding one or more further user determined row and/or column headings for the table from those available in the dimensions, and re-executing the program to fill in the empty cells.

In a preferred embodiment of the invention the records are records of quantities and the said data corresponding to the set intersections in the summation of the quantities of the records of the intersection.

Preferably the dimensions include sub-headings which may be used as column and row sub-headings in the select table. It is convenient to arrange that the headings and sub-headings for the rows and columns may be stacked to qualify the sets for which intersections are sought.

The dimensions may be tree structures having nodes representing the said headings from which branch further nodes representing the said sub-headings, each record including a locator field designating its node in each dimension and for each node there being available a list of the records appropriate at that node.

It will be appreciated that a free form query structure as proposed by the present invention may require the simultaneous calculation of a very large number of intersections, far larger, in fact, than the number allowed by the more restricted graphical or structured language techniques employed hitherto. A preferred programming technique makes this possible in an acceptable processing time, thereby rendering the system practical for large databases. This technique provides that lists of node records are stored as bit strings of length corresponding to the total number of records and with bits turned on or off (set to "1" or "0") according to whether the record for the bit number is present at the node or not and the determination of set intersections is effected by successive logical AND operations on the bit strings for the nodes selected in the select table. With this arrangement advantage can be taken of the very fast bit string comparison techniques built in to most computer languages.

Although it is possible to store bit strings for each node of each dimension this is not necessary. Preferably bit strings are stored for only the leaf nodes, namely those at the ends of the branches. For processing queries at higher levels a transient bit string for a higher level node is obtained by an OR operation (union) on the bit strings of the leaf nodes which depend from it.

There are some query statements that do not readily lend themselves to being included in the free form tabular structure described above without imposing processing time handicaps. These include NOT operators (exclusion qualifiers) and size qualifiers such as "greater than" or "less than". Preferably, a textual language facility is added whereby a query answer table which has been derived by the free form technique can be qualified.

According to another aspect of the invention there is provided apparatus for performing the above described method, the apparatus comprising a computer with a storage medium holding a database, the database having a number of records and a number of dimensions in which each record is represented, the dimensions including headings, and the computer being programmed to present a blank elementary select table whereby a user may add row and column headings for the table from those available in the dimensions, thereby defining rows and columns and empty cells at the crossings of the rows and columns, the program being further effective to fill in the cells with data corresponding to the set intersections of the row and column headings.

Another aspect of the invention provides for the use of natural language input. In order to make computer information systems more widely accessible and more user friendly, research effort is being expended to design computer systems that can interpret queries posed in natural language, i.e. language as ordinarily used by humans as opposed to a specialized database query language such as SQL.

It is known to use natural language input in combination with other forms of input to a computer system in a complementary manner. Examples are discussed in a joint paper entitled "Synergistic Use of Direct Manipulation and Natural Language" from the Artificial Intelligence Centers of SRI International and Lockheed Missiles and Space Co.

According to another aspect of the invention there is provided in a system as described above where input means are provided to permit a user to specify information selection criteria, further input means for permitting a user to make natural language input and further comprising means for combining the attributes selected using the first input means with those embodied in the natural language input and which is operable to interpret the natural language input in the context of the other input.

BRIEF DESCRIPTION OF THE DRAWINGS

The present invention also encompasses methods for interrogation of a computer database that comprise the steps of providing a blank elementary select table, selecting a plurality of dimensions, adding to the select table row and column headings respectively corresponding to the selected dimensions, thus defining rows and columns and empty cells at the intersections of the rows and columns, and filling the empty cells with data derived from the computer database.

The present invention also encompasses computer systems comprising a computer database including a plurality of records each of which is represented in a plurality of dimensions, and program mans for interrogation of the database. The program means comprises a means for generating a blank elementary select table and displaying the same to a user, means for reading input from the user defining a plurality of selected dimensions, means for adding to the select table row and column headings that respectively correspond to user-selected dimensions, and means for filling empty cells with data derived from the computer database. The empty cells are defined by the intersections of rows and columns that correspond to the row and column headings.

Other features of the present invention are described below in connection with the detailed description of preferred embodiments.

BRIEF DESCRIPTION OF THE DRAWINGS

Figure 1:
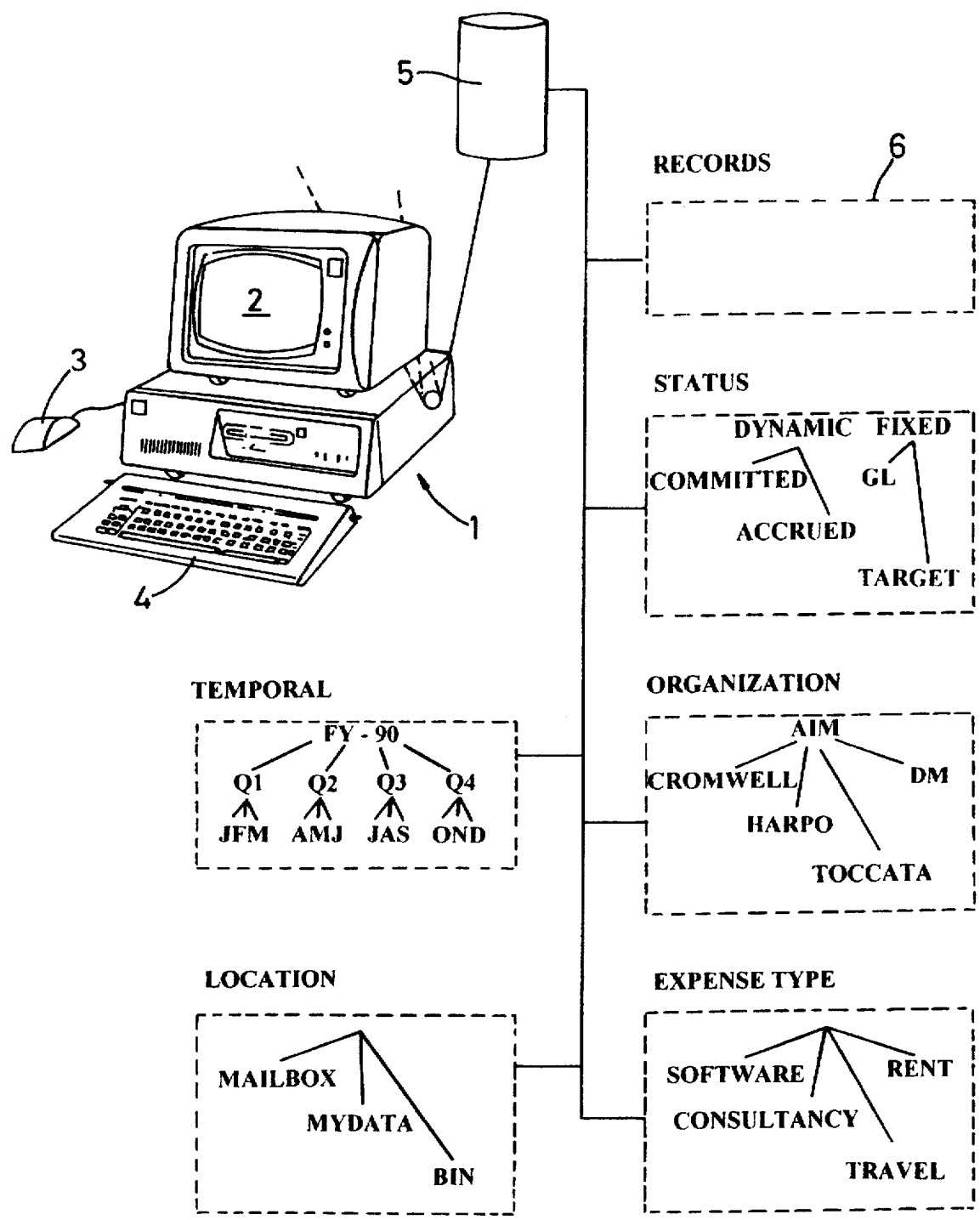
Figure 2:
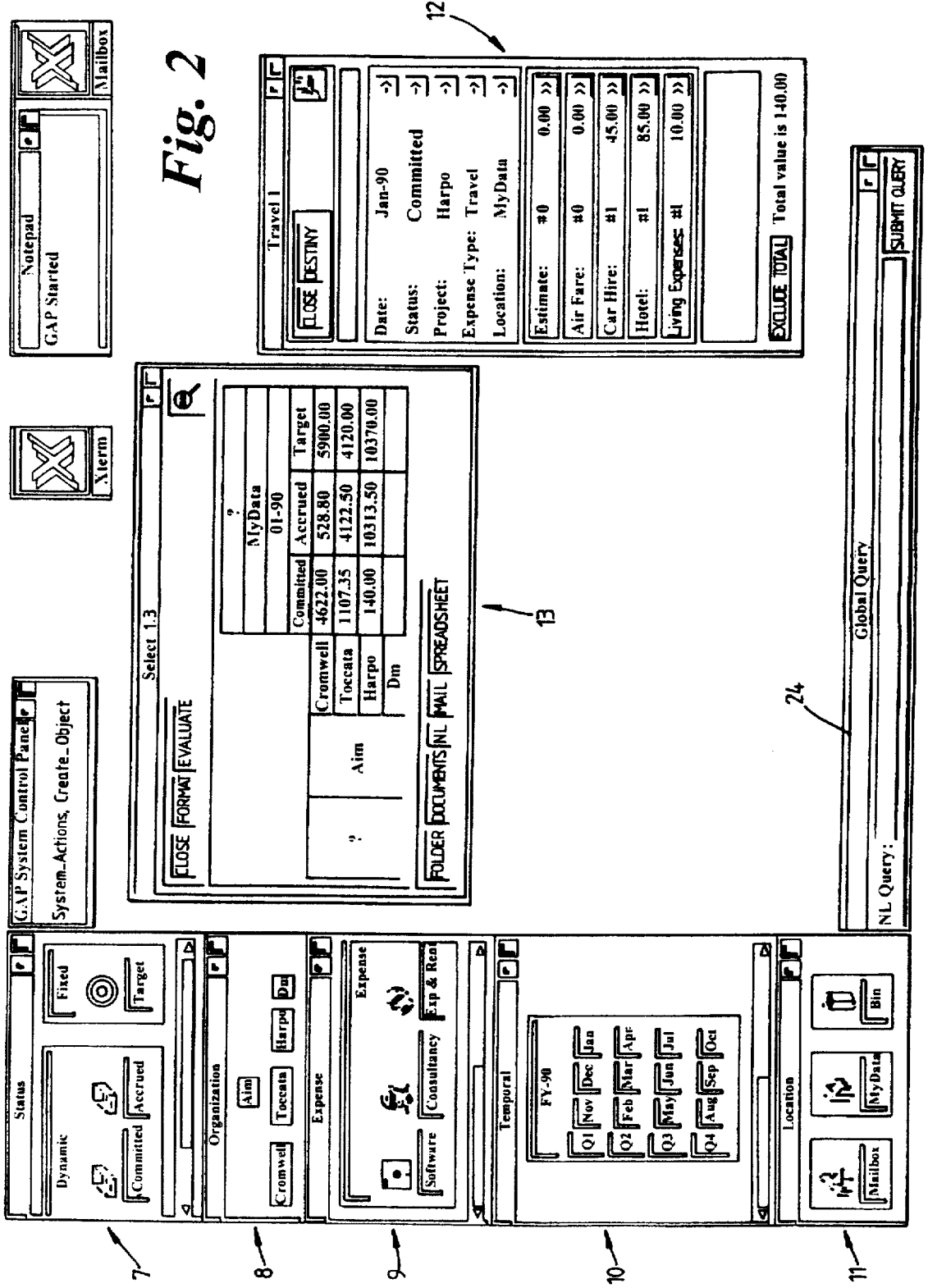
Figure 3A:
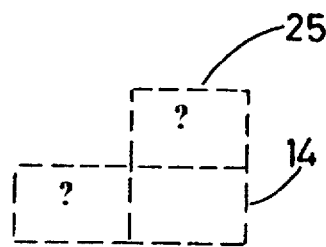
Figure 3B:
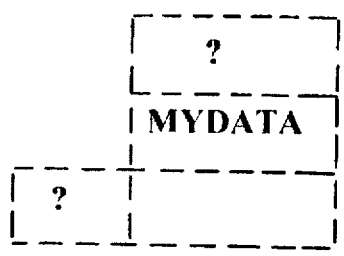
Figure 4A:
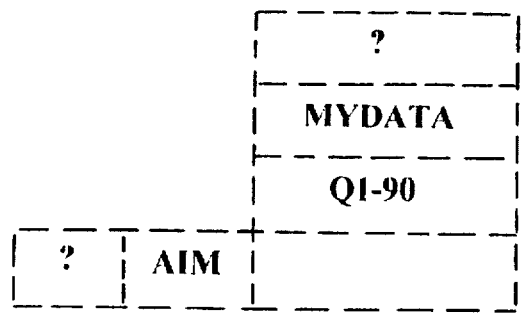
Figure 4B:
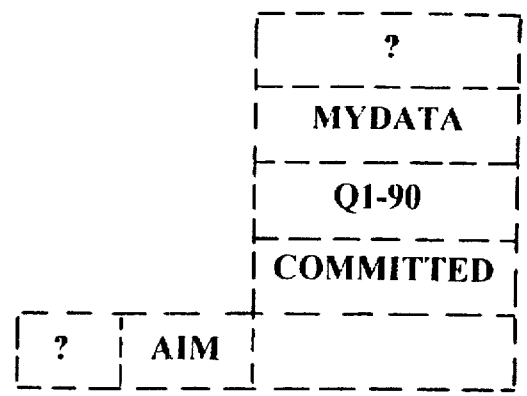
Figure 4C:
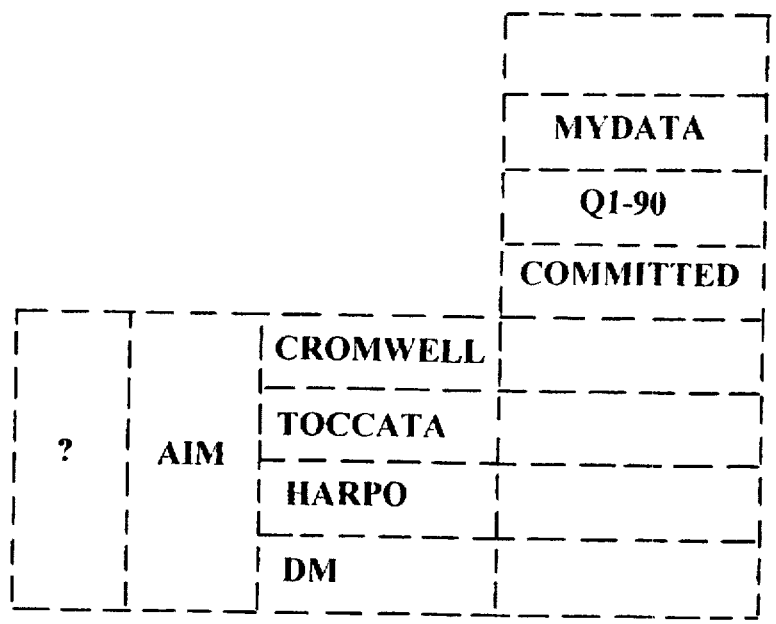
Figure 9:
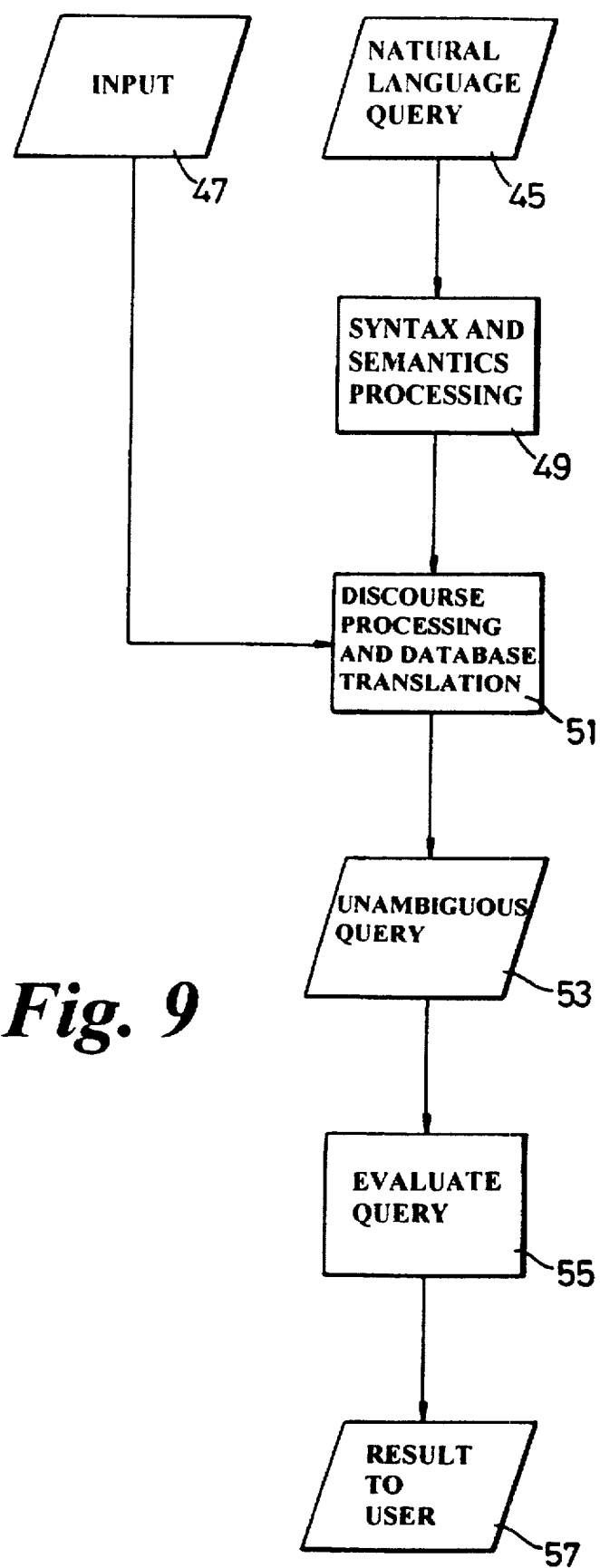

The invention will further be described with reference to the accompanying drawings, of which:

FIG. 1 is a schematic view of apparatus in accordance with the invention comprising a programmed computer with a database;

FIG. 2 is a diagram of the screen presentation for implementing the method of the invention with the apparatus of FIG. 1;

FIGS. 3(a)-3(f) are a multi-part diagram showing successive stages in the building of the query table of FIG. 12, and FIG. 3(g) is an illustration of an alternative construction of the query table;

FIGS. 4(a)-(c) are a multi-part diagram illustrating the extension of a free format query table in accordance with the invention;

FIG. 5 is a diagram illustrating the contents of a record in the database of the apparatus of FIG. 1;

FIG. 6 is a diagram illustrating the bit string comparison technique employed in the preferred method in accordance with the invention;

FIGS. 7 and 8 are further examples of query tables;

FIG. 9 is a flow chart showing processing of an NL query; and

Figure 10A:
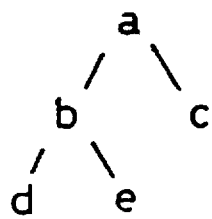
Figure 10B:
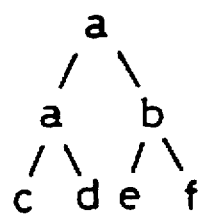
Figure 10C:
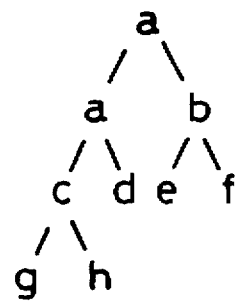

FIGS. 10(a)-(c) is a multi-part diagram illustrating a tree structure of the system.

DETAILED DESCRIPTION OF THE PREFERRED EMBODIMENT

Referring to FIG. 1 there is shown a general purpose computer conveniently of the personal computer (PC) kind and preferably part of a network of similar machines, although this is not illustrated. The computer 1 has a screen 2, a mouse 3, a keyboard 4 and a hard disk 5. The computer runs under a Windows environment and the mouse is used in conventional manner to select items from pull-down menus and by reference to icons.

A database is stored on the hard disk 5. In this illustration the database is for the domain of financial planning over a given time period in an organization which has several projects running and which incurs expenses of several kinds. Thus, the database has a set 6 of records, each of which has a record number, an expense value and fields which give a location and other information. A more detailed description of a record will be given later.

In addition, the database stored on the hard disk 5 has five dimensions into which each record falls. Each dimension has a tree structure with nodes and branches. The five dimensions are: STATUS; ORGANIZATION; EXPENSE TYPE; TEMPORAL; and LOCATION.

STATUS DIMENSION

The status dimension has two primary nodes; DYNAMIC and FIXED. The DYNAMIC node branches to two further nodes: COMMITTED and ACCRUED. The FIXED node branches to nodes TARGET and GL. Each node represents a status of an expense (record). The status of an expense will change as it passes through the system.

ORGANIZATION DIMENSION

The organization dimension has a node AIM which branches to project nodes CROMWELL; TOCCATA; HARPO and DM. These nodes represent projects to which the expenses are assigned.

EXPENSE TYPE DIMENSION

The TYPE node branches to SOFTWARE; CONSULTANCY; RENT and TRAVEL. These are the types of the expenses.

TEMPORAL DIMENSION

This is a calendar dimension having a node FY90 (Financial Year 1990) which branches to "quarter" nodes Q1; Q2; Q3 and Q4. The quarter nodes branch to respective "month" nodes: J; F; M; etc.

LOCATION DIMENSION

The LOCATION node branches to system location nodes to where the expense has been assigned: MAILBOX; MYDATA; and BIN.

Referring now to FIG. 2 there is shown a screen presentation typical in the execution of the invention.

The screen has multiple windows. At the left-hand side is a set of windows representing the dimensions described above: window 7 for the STATUS dimension; window 8 for the ORGANIZATION dimension; window 9 for the EXPENSE TYPE dimension; window 10 for the TEMPORAL dimension and window 11 for the LOCATION dimension.

At the right hand side is a window 12 which shows a typical expense record with the name TRAVEL. At the top part of the record are shown the nodes of the dimension which the record occupies, namely TEMPORAL; JAN 90; STATUS; COMMITTED; ORGANIZATION; HARPO; EXPENSE TYPE, TRAVEL and LOCATION, MYDATE. This information is stored in the record on the database. Other fields in the record give the illustrated details of the expense and its value.

At the center of the screen is a window 13 which has a free form query select table. The table in this illustration has been set up to interrogate the database by filling in column headings and sub-headings with LOCATION, MYDATA; TEMPORAL, Q1–09; STATUS, COMMITTED, ACCRUED and TARGET and by filling in the row headings and sub-headings with ORGANIZATION, AIM, CROMWELL, TOCCATA, HARPO and DM. The table created is thus a 3×4 table with twelve cells at the crossings of the rows and columns. By clicking the mouse on EVALUATE, the program is triggered to fill in the cells with the totals of the values of the records which are the intersections of the sets dictated by the table.

The column and row headings and sub-headings are selected from the node names of the dimensions by means of clicking and dragging with the mouse. Any combination can be selected and it is immaterial whether the headings are in rows or columns. From the illustrated column headings it will be seen that headings may be stacked—e.g. "Mydata"; "Q1–09" and the three status headings (COMMITTED, ACCRUED, TARGET). The program evaluates the intersection of the sets thus defined and sums the values of the expenses to display them in the cells.

Specific program code for summing and displaying the selected data is not set forth in this specification since the writing of such code will be well within the ability of a person skilled in the art of computer programming.

If the database were essentially a non-numerical database then the cell would display the number of records in the intersection. The records could be listed by expanding the cell into another window or by scrolling in the cell, for example.

In FIG. 3(a)–(f) there is illustrated the successive stages in building the query table 13 of FIG. 2. Initially, the user is presented with an elementary select table 14, as shown in FIG. 3(a). By clicking and dragging with the mouse to the column query 25 the user inserts the "Mydata" heading from the LOCATION dimension, FIG. 3(b). Then he inserts the heading "Q1–09" from the TEMPORAL dimension, FIG. 3(c). Next he selects sub-headings "Committed", "Accrued" and "Target" from the STATUS dimension as subheadings, FIG. 3(d). These column headings are thus stacked and already an intersection set of records corresponding to the logical AND of the column headings has been established in the computer memory in a manner to be described.

Figure 3C:
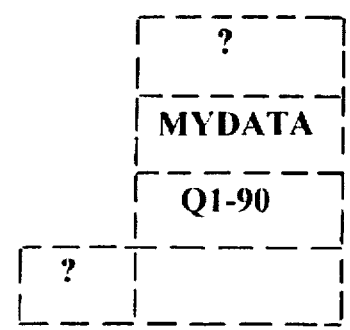
Figure 3D:
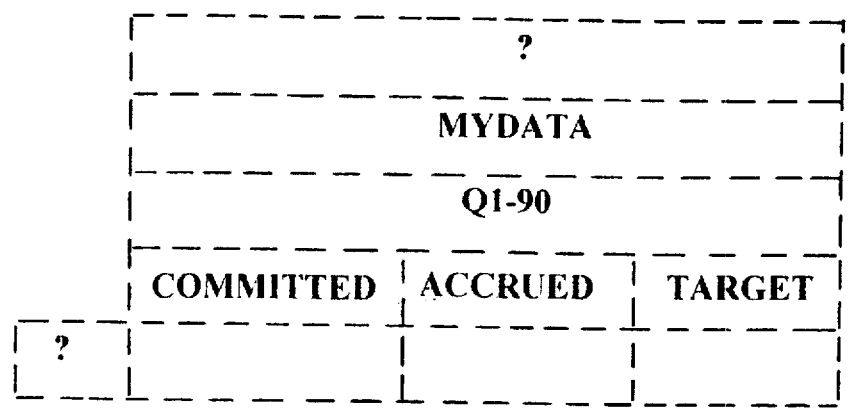
Figure 3E:
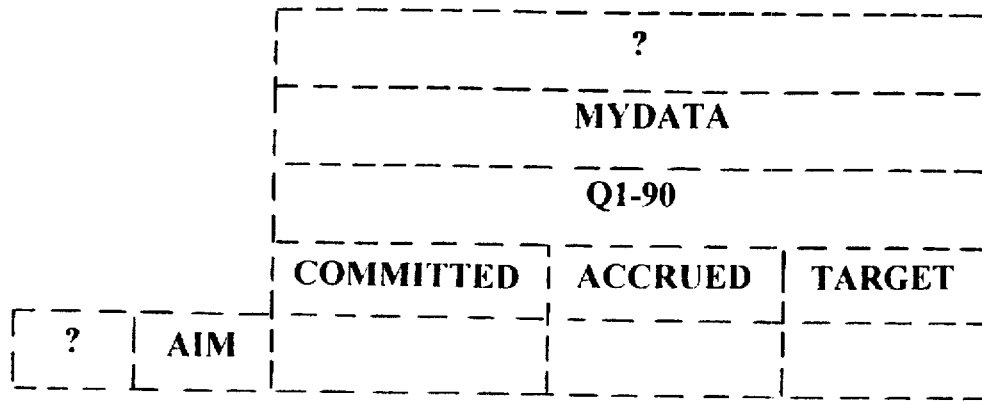
Figures 3F, 3G:
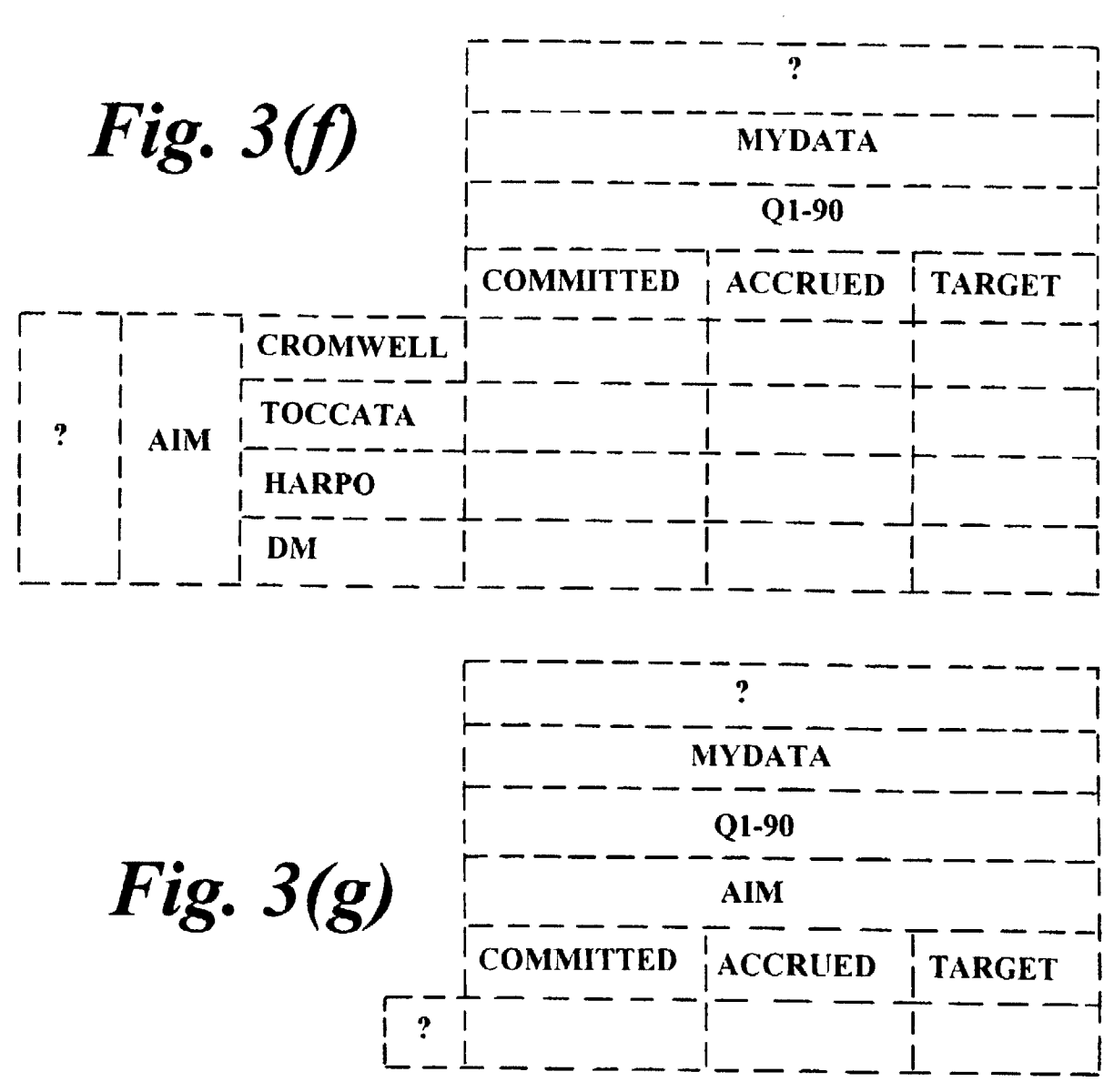

FIGS. 3(e) and 3(f) show the successive stages of selecting the row heading "AIM" and sub-headings "Cromwell", "Toccata", "Harpo" and "DM". When a select table has been used it is stored so that it may be re-used or modified to give a new select table.

It should be appreciated that, after FIG. 3(c), the row heading "AIM" could have been used instead as another column heading prior to the insertion of the status headings in FIG. 3(d) so that there would be no row headings in the select table, as shown in FIG. 3(g). In practice it usually produces a more readable table to use both row and column headings but a user could use just row headings or just column headings if desired.

In FIGs. 4(a)–4(c) the successive stages in building a query table an illustrated. The starting point is taken as the table of FIG. 3(c). Next the user selects the row heading "AIM" from the ORGANIZATION dimension, FIG. 4(a). By clicking on the "execute" button the user executes the program to evaluate the intersection of the sets. Here there is only one cell and one answer.

Having considered the answer, the user may conclude that he requires a break-down. He can achieve this by expanding the query select table and re-executing the evaluation program. By clicking on the column query mark 50 and the "committed" node in the displayed STATUS dimension, the user qualifies the column headings by the "committed" status. This is shown in FIG. 4(b). Then, by clicking on the AIM row heading 51 and the row query 52, the user automatically qualifies the AIM heading by the four project sub-headings "Cromwell"; "Toccatta"; "Harpo" and "DM". Further cells are automatically introduced at this stage and execution of the program fills all the cells in with their appropriate figures as shown in FIG. 4(c).

Referring now to FIG. 5 there is shown the format of a record. The record has a number according to its address in the record file. This is not explicitly stored in the record itself. At the beginning of the record is a text field 16 for record type, a number field 17 for record value, and then follow a locator field 18 and free fields 19. The locator field has five addresses corresponding to the nodes which the record occupies in the five dimensions. Thus, for the example of the record at 12 in FIG. 2, the locator addresses would be for Q1–09 (TEMPORAL); Committed (STATUS); Harpo (ORGANIZATION); Travel (EXPENSE TYPE) and Mydata (LOCATION). The free fields 19 carry the detailed information shown at 12 in FIG. 2.

As the appropriate data is entered on the "record sheet" shown as 12 in FIG. 2, so the dimension leaf nodes are updated. Each dimension leaf node carries a record of the record numbers appropriate to that node. This information is stored in a particularly useful way, as illustrated in FIG. 6. Here there is a node list which is a field of successive bytes having a total number of bits corresponding to the total number of records in the database. If a particular record is appropriate to the node then the respective bit number of the node list bit string is turned on (status 1). If not it has status 0.

As successive headings and sub-headings are selected for the query table, the respective node bit strings are operated upon to produce further bit strings. Thus, if a higher level heading such as Q1 is selected, the appropriate leaf node bit strings (JFM) are ORed to produce an intermediate union bit string. Any such intermediate bit strings are finally ANDed with each other and with leaf node bit strings as appropriate to produce further bit strings which represent the records belonging to the intersection of the node sets. This process is repeated for successive selections and it will be seen that in this way bit strings representative of the record sets for the cells of the table can be rapidly derived. It is then a simple matter to scan the values of the records for insertion of the totals in the cells.

As an illustration, FIG. 6 shows a first node bit string 20 with records 1, 3, 6, 7 and 8 present; a second node bit string 21 with records 2, 3, 5, 6 and 9 present and the intersection bit string 22 of these with records 3 and 6 present.

In addition to deriving the intersection of bit string sets, the computer language allows the union of sets and other set operations to be executed. For example, NOT OR and XOR instructions can be executed. In order to facilitate the introduction of other instructions, including quantitative instructions such as "greater than", "equals", and "less than", the screen of FIG. 2 has a natural language (NL) query box 24 whereby query text can be entered by keyboard. Conveniently such queries operate as the results of a free form query as displayed.

The free form query table may act as a "context" for a natural language query, and so influence how that NL query is interpreted by the system, and, in turn, influence the form of the response to the NL question.

In this augmentation of the approach described above it is possible for both the STRUCTURE and CONTENT of a table to act as a context for an NL query. For example, the entire table shown in FIG. 7 can act as a context. Against this context, a query such as "Summarize the expenses for all quarters in FY-91" will yield the table in FIG. 8. Here the query is assumed to range over the restricted world of expenses for TRAVEL and for AIM. Crucially, however, the structure of the context table is preserved in the output table: the labels for AIM and TRAVEL remain.

By selecting a tabular context for an NL query, a user is specifying some parameters in advance of those expressed in the NL query. This approach can enhance user productivity by providing flexibility and obviating the need to type in long NL sentences.

Considering the query:

"Summarize the expenses for all quarters in FY91" when posed in the tabular form shown in FIG. 7 we will describe how such a table can be used to contextualize an NL query. First however, it is useful to consider the basic linguistic processing applied to a sentence, irrespective of whether it is given a tabular context.

FIG. 9 shows the standard main steps in processing an NL query 45. Standard NL processing techniques are used at step 49 to derive from the sentence a semantic representation. At step 51, discourse processing and database translation techniques are used, along with any other relevant input 47, to derive an unambiguous query 53 which is then evaluated in the database at step 55 and the result 57 is provided to the user.

One possible implementation uses the Core Language Engine, developed at SRI International (Alshawi et al 1989), but other programs could be used.

For the above sentence, the system derives the following representation (here simplified and altered for the purposes of exposition):

(SHOW-SUMMARY
 (Set X s.t. (EXPENSE-FORM X) & (FOR-TIME X Q)
 (QUARTER Q) & IN-PERIOD(Q fy-91)))]

This can be read as follows: "show a summary of the set consisting of all those values X, where X is an expense form, X is for a time period Q, Q is a quarter, and Q is in the time period FY-91. (Here, "s.t." means "such that"). To find the relevant expenses in the database, the expression which corresponds to the NOUN PHRASE "the expenses for quarters in FY-91", (SET . . . )

must be evaluated against the database. This is done by translating the (SET . . . ) expression into a formal query in the database query language, and running the query against the database.

(It is a simple matter to translate this (SET . . . ) representation into a database query in a database query language, and depending on the database query scheme used—e.g. SQL or Prolog—the final database query will look similar or different to the representation above).

The query is executed against the database to return the set of values X which satisfy the constraints placed on them. Here we are assuming that X is some representation of an expense form—eg. if a unique number is used for every distinct expense form, the above expression would evaluate to a set such as (23,43,52,16,27, . . . ) where each number denotes an expense-form.

We then apply the SHOW-SUMMARY procedure to this set; this looks up the expense form details associated with every expense-form identifier and represents them on the screen in the desired format.

The contextualization of sentences requires augmentation of the process of interpreting the sentence. It has been found that for some applications, queries to the system typically include all of the relevant restrictive information in the main noun phrase of the sentence. For this reason, when considering tabular contexts, we shall describe inserting the tabular restrictions at the noun phrase level only. If we assume the tabular context of FIG. 7 this introduces the contextual restricts on X, that:

(FOR ORGANIZATION X aim) & (FOR-purpose X travel)

These restrictions can be derived from the table on the basis of a set of rules which—for example—translate the tabular label "travel" into the constant used to describe "travel" in the linguistic world. Knowledge built into the linguistic program enables it to infer that the appropriate restriction for travel is "FOR-PURPOSE", and similarly the predicate "FOR-ORGANIZATION" for the other label.

This representation of the tabular context can be merged with that for the sentence, to produce the following representation for the contextualized sentence:

(SHOW-SUMMARY (SET (X s.t (EXPENSE-FORM X)
 & (FOR-TIME X Q)
 (FOR-ORGANIZATION X aim) & (FOR-PURPOSE X travel)
 (QUARTER Q) & IN-PERIOD (Q fy-91)))]

Hence the evaluation of the contextualized sentence will produce a set of those values X, restricted as before in pure linguistic processing, and in addition restricted so that X is for the organization AIM and X is for the purpose of travel.

In this way, when the query has been given a tabular context, then the attributes already present in this table are combined with those derived from the linguistic phrase to produce the new structure of the table. At the same time, when searching the database for all "expenses for all quarters in FY-91", we further restrict the search in line with the attributes specified in the table—i.e. TRAVEL and AIM.

In addition, in the system described above, the response to a natural language question or command can be represented as a summary table, as well as a set of expense forms; the user can state which is preferred.

For example, the user can type "Summary the committed expenses for all projects in FY-90". The response can be in the form of a table of exactly the same kind as those produced by standard tabular querying.

Such a table produced by the NL is not simply a static image displayed on the screen. It is a dynamic object which has all the properties of a table produced through the standard "point-and-click" route of tabular querying. Therefore such a table can be developed by further selection and formatting, from the graphical models, and it is possible to "drill-down" from any of its cells to retrieve the relevant expense forms. This is possible by effectively representing the content of the NL query in the "language" of summary tables so everything that the NL query expressed can be conveyed in the tabular query.

The present invention also has more general application in combining MENU-based querying with NL-based querying. Reference will now be made to the above example of contextualizing. NL against tables. In the abstract, this involves contextualizing against a set of discrete selections from a space of possibilities (e.g. select expense status=PLANNED, expense type=TRAVEL, and so on.) Such a space of possibilities is very often represented as a MENU system, where the user is asked to select from a set of options presented to him/her. In that example, the domain of expense dimensions could be represented in menu terms as follows. When we enter the system, we can do one of five things:

> Specify some STATUS dimensions
> Specify some ORGANIZATION dimensions
> Specify some EXPENSE TYPE dimensions
> Specify some TIME dimensions
> State a restriction in natural language We choose the first option, and the system gives us these choices:

> I want FIXED expenditure
> I want DYNAMIC expenditure
> State a restriction in natural language You choose "DYNAMIC" but because DYNAMIC has subcategories you are given another choice:

> I want all DYNAMIC expenditure
> I want PLANNED expenditure
> I want COMMITTED expenditure
> I want ACCRUED expenditure
> State a restriction in natural language You make your choices, say PLANNED and COMMITTED, and hit a button to indicate that you have finished your selection on this screen. You return to the previous screen B, and again indicate that you have finished at this level. The menu then gives you these options:

> Specify some ORGANIZATION dimensions
> Specify some EXPENSE-TYPE dimensions
> Specify some TIME dimensions
> State a restriction in natural language Let's say you do a similar thing in the expense-type menu "space" and when you have finished that you have chosen the following:

> (I want PLANNED or COMMITTED expenditure,
> I want TRAVEL expenditure)
> At this point you have the following options:
> A3    Specify some ORGANIZATION dimensions
>     Specify some TIME dimensions
>     State a restriction in natural language
>     You decide on NL, and the system gives you this
> screen:
> E    Please enter NL query:
>     You type:
>     "for the first three quarters in FY-91"

At this point you return to the menu main screen, which will be the same as A3. Your restrictions are now effectively:

> (I want PLANNED or COMMITTED expenditure,
> I want TRAVEL expenditure, I want Q1 or Q2 or Q3
> expenditure)

Let's say you have made all the selections you want. Your selections and NL can be translated into an expression for evaluation, such as:

> (SET X s.t. (EXPENSE-FORM X) & (FOR-PURPOSE X travel)
> & [ (HAS-STATUS × PLANNED) OR (HAS-STATUS × COMMITTED) ]
> & [ (FOR-TIME × q1) OR (FOR-TIME × q2) OR (for-time × Q3) ])

When a request of menu selections to be evaluated against the database is made, the query evaluation phase will return all Xs that satisfy these constraints. Constraints that arise from selections WITHIN the same "dimensions" are ORed. Restrictions underlying the menu selections e.g. "TRAVEL" can be converted into NL-orientated restrictions in a manner similar to that described for the tabular format example. That is, these restrictions can be derived from the menu selections on the basis of a set of rules which e.g. translate the menu label TRAVEL into the constant used to describe "travel" in the linguistic world. Knowledge built into the linguistic program enables it to infer that the appropriate restriction for TRAVEL is "FOR-PURPOSE". Any restrictions from the same dimension are ORed.

It should be noted that rather than processing only complete sentences, a system according to the invention may be configured to process fragments of sentences.

The tree structures of FIG. 1 (typically the TEMPORAL tree) represent dimensions, or in other words classifications, of the domain. There follows a discussion of the interpretation of the classification trees and the selector row and column headings which are combined to provide the database query mechanism.

The nodes of the classifications trees correspond, either directly or indirectly, to a set of data base records in the following way:

If the classification tree node is a leaf node, i.e. has no children, then it represents a set of records obtained by retrieving all records from the database that have a particular value for a specified data field. Should this set of records be retrieved from the database then these records may be remembered to avoid this computation in the future.

If the classification tree node is not a leaf node, i.e. it has children nodes, then it represents the union of the sets of data records corresponding to each of the children nodes.

Thus, it is possible to associate a database query with each node in the classification tree. For example, in a tree having the format of FIG. 10(a) the leaf nodes d, e and f are associated with the queries.

d: key="d value"
    e: key="e value"
    f: key="c value"

The two non-leaf nodes are associated with the queries b: union of query (key="d value") and query (key ="e value") and a: union of (union of query (key="d value") and query (key="e value")) and query (key="c value").

The query for a can be re-written as follows a: union of query (key="d value") and query (key="e value") and query (key="c value")

That is, each node in the classification trees correspond to a union of one or more sets of data records, each corresponding to a database query of the form key="value".

A selector is a two-dimensional report whose column and row headings are specified by the user by selecting nodes from the classification trees. Once the columns and rows have been specified, then the implied query may be posed and the results displayed to the user.

The rows and columns are handled in the same way. Consider only the column headings. The column headings form a tree, the leaves of which correspond to each column. Each node in the headings tree is associated with a particular node in the classification trees. Each node in the headings tree is assumed to represent the set of records formed by intersecting the set of records associated with the node's parent and the set of records associated with the classification node. The root node, always labelled '?', is assumed to refer to the entire database.

Thus, if there is a headings tree of the form of FIG. 10(b) then the heading of "c" represents a set of records obtained by the query:

intersection of (intersection of whole data base and (query associated with classification node a)) and (query associated with classification node c). Rearranging this query gives intersection of (whole database)

and (query associated with classification node a)

and (query associated with classification node c)

That is, each heading represents a conjunction of queries, each query being the disjunction of sets of records.

When the user requests that a "selector" be "executed", then a data structure representing each row and column is created. This data structure is an access plan. That is, it represents a set of activities that will be performed that results in a set of records being associated with each row and column. As described above, each column heading represents a conjunction of disjunctions of sets of records. That is, can be represented as a data structure with the following structure:

```
intersect(union(query11, query12, query13, ...),
union(query21, ...),
.
.
.
)
```
This structure may be rewritten, and so optimized, by using a number of rules:
1. union(Whole database, Set)     = Whole Database
2. intersection(Whole database, Set)   = Set
3. intersection(Set, Set)              = Set
4. union(Set, Set)                     = Set
5. intersection(Set given by key = value1,
   Set given by key = Value2) = Empty Set
   if Value1 and Value2 are different.
6. intersection(Set, EmptySet)         = Empty Set
7. union(Set, EmptySet)                = Set Once the structure has been optimized, then the query is posed. This results in sets of records being associated with each row and column in the selector. These sets of values are permanently associated with the row and column headings.

The set of records for each cell in the report can now be obtained by taking the intersection of the appropriate row and column sets.

There follows a description of the processing required to re-pose a query defined by a selector.

The user is permitted only to amend the row and column headings by adding additional nodes to existing row and column headings. If the existing query was posed, then the original leaf nodes would have been annotated with their access plan and the resulting set of records. This information may be used to optimize the query execution.

Assume the original columns tree has the format of FIG. 10(b). This is then evaluated which causes the nodes c, d, e and f to be annotated with their query access plan and the resulting set of records. This tree is then amended to the form of FIG. 10(c).

To generate the access plan for the new nodes g and h, it is necessary only to intersect the set of values associated with node c with the sets of values corresponding to classification nodes g and h. This eliminates the need to consider the whole columns tree when generating the access plans—and so increases speed.

There follows a description of the data structures of the system. There are a number of classification trees each corresponding to a different 'dimension' in the database. There is a data structure to store the roots of each of the trees:

classification_tree(tree_name, root_node_id).

Each node in the classification trees is given a unique identifier and has one of the two following structures:

classification_tree_node(unique_identifier,
"leafnode",
tree_name,
unique_identifier_of_parent,
query_associated_with_node,
"uncached" or set of records from database).

classification_tree_node(unique_identifier, "nonleafnode",
tree_name,
unique_identifier_of_parent,
list_of_unique_identifiers_for_each_child).

Lastly, it is necessary to track which hierarchy nodes have been selected by the user. This will be used to modify a selector, and then to ensure that the hiearchy nodes are redisplayed in their default state.

Each existing selector has a data structure that describes its current state. This has the format:

```
selector(unique_identifier,
    column_structure,
    row_structure,
    set_of_currently_selected_cells,
    set_of_currently_selected_rows,
    set_of_currently_selected_columns).
```

As the user selects cells in the selector for further processing, the set of currently selected cells is maintained. Similarly for the set of currently selected rows and columns.

```
The rows and columns are defined as follows:
heading_root_node(RootNodeId),
heading_node(unique_identifier,
    maps_to_classification_tree_node_id,
    unique_identifier_of_parent,
    list_of_unique_identifiers_for_children,
    access_plan,
    set_of_records).
    the access_plan is a tree structure whose
nodes are defined as follows:
    access_plan_node ::= intersection( list of
        access_plan nodes )
    or union( list of access_plan_nodes )
    or leaf_set( set of records
    or query( query )
```

If the access plan or the set_of_records has not yet been computed then an indicator value is used.

There follows a description of the computation that is performed in order to modify an existing selector to build a new selector.

To amend an existing selector the user performs the following actions:

1. Select a number of classification tree nodes. This results in a set of "selected classification nodes".
2. Select one or more row and columns in the target selector.

This results in a set of "currently selected rows" and "currently selected columns".

3. Select a "Format" option.

This causes a copy to be made of the entire data structure that represents the selector. Because structure sharing is used this is not as expensive as it might appear. New row and/or column nodes are created, one for each classification node in the selected set. These nodes are linked into the set of children associated with each of the selected row and column nodes. The new selector is then displayed. All nodes marked by the user in the classification trees, row headings or column headings are reset back to their default state and the sets of selected items cleared.

In order to evaluate a selector the following steps are necessary:

1. Make a copy of the old selector to work upon.
2. Compute the set of records that are associated with each row and column.
3. Redraw the new selector, calculating the values for each cell. The cell value is a function of the set of records defined by the intersection of the records associated with the row and column the cell lies in.

With regard particularly to the second step, consider each leaf node of the row (and column) header tree. If the leaf node contains a set of previously computed records then no further processing is necessary—the old results may be re-used. If not previously computed, then the row header tree is traversed upwards towards the root building up an access plan. Traversing is stopped once either the root node is reached, or a node that contains a set of records (from a previous evaluation) is reached. A new access plan is generated and optimized using the rules mentioned above. This access plan is then executed and the resulting set of results stored in the leaf node. In this way much of the computation performed in earlier selectors can be re-used.

What is claimed is:

1. A method of interrogation of a computer database, the database having a number of records and a number of dimensions in which each of said records is represented, each dimension comprising a range of possible values, the dimensions including headings denoting value sets in the range of possible values for the respective dimension and the method comprising the steps of:

displaying a blank elementary select table and a plurality of user-selectable row and column headings;

adding a plurality of user-selectable row headings and a plurality of user-selectable column headings for the table from those available in the dimensions so as to specify value sets, thereby defining a plurality of rows and a plurality of columns and empty cells at the crossings of the rows and columns; and executing a database search program which searches said computer database using the value sets of the row and column headings for each of said empty cells and fills in each respective empty cell with data from said computer database corresponding to an intersection of the value sets of the row and column headings for said respective empty cell.

2. A method as claimed in claim 1, further comprising the steps of adding one or more further user-selectable row and/or column headings for the select table from those available in the dimensions, and re-executing the database search program to search said computer database and fill the empty cells.

3. A method as claimed in claim 1, wherein the records are records of quantities and the said data corresponding to the set intersections is the summation of the quantities of the records of the intersection.

4. A method as claimed in claim 3, wherein the dimensions include subheadings which may be used as column and row sub-headings in the select table.

5. A method as claimed in claim 4, wherein the headings and sub-headings for each particular row and each particular column are respectively aligned to define a row heading set intersection and a column heading set intersection and comprising executing a program which fills in said cells at the crossing of each said particular row and each said particular column with data corresponding to the set intersection of the row heading set intersection and the column heading set intersection.

6. A method as claimed in claim 4, wherein the dimensions are tree structures having nodes representing said value sets from which branch further nodes representing value sub-sets, each record includes a locator field designating its node in each of said dimensions, and for each of said nodes there is available a list of the records appropriate to that node.

7. A method as claimed in claim 6, wherein each of said list of records appropriate to each node is stored as a bit string of length corresponding to the total number of records and with bits turned on or off according to whether the record corresponding to that bit is present at the node or not, and the bit strings corresponding to the nodes selected in the select table are logically ANDed to obtain set intersections.

8. A method as claimed in claim 1, wherein the results of a query are further processed for one or more natural language queries which may include exclusion qualifiers or size delimiters.

9. Apparatus comprising a computer with a storage medium holding a database, the database having a number of records and a number of dimensions in which each of said records is represented, each dimension comprising a range of possible values, the dimensions including headings denoting value sets in the range of possible values for the respective dimension, and the computer comprising means for presenting a blank elementary select table and row and column headings to a user for enabling said user to add row and column headings for the select table from those available in the dimensions so as to specify value sets, thereby defining rows and columns and empty cells at the crossings of the rows and columns; and means for searching said database using the value sets of the row and column headings for each of said empty cells and filling the cells with data from the database corresponding to the set intersections of the row and column headings for each cell.

10. Apparatus as claimed in claim 9, further comprising first input means for permitting a user to specify said row headings and said column headings in said select table, second input means for permitting a user to make natural language input, means for processing the natural language input in order to define further row and/or column headings, and means for combining attributes selected using the first input means with those embodied in the natural language input so as to evaluate empty cells at the crossings of all of the relevant row headings and column headings.

11. A method for interrogation of a computer database having a plurality of records and a plurality of dimensions in which each record is represented, each dimension comprising a range of possible values, the dimensions including headings denoting value sets in the range of possible values for the respective dimension, the method comprising the steps of:

(a) displaying a blank elementary select table and a plurality of user selectable headings;

(b) selecting row and column headings from a plurality of dimensions;

(c) adding said selected headings as row and column headings in said select table so as to specify value sets, thereby defining a plurality of rows and a plurality of columns and empty cells at the intersections of said rows and columns; and (d) searching said computer database using the value sets of the row and column headings for each of said empty cells and filling the empty cells with data from said computer database derived from the value sets in the computer database corresponding to an interaction of the row and column heading for each empty cell.

12. The method recited in claim 11, further comprising the steps of summing data from a plurality of records in accordance with the row and column headings and filling the empty cells with data indicative of the sums.

13. The method recited in claim 12, wherein the headings and sub-headings for each particular row and each particular column are respectively aligned to define a row heading set intersection and a column heading set intersection and comprising executing a program which fills in said cells at the crossing of each said particular row and each said particular column with data corresponding to the set intersection of the row heading set intersection and the column heading set intersection.

14. The method recited in claim 13, wherein the dimensions comprise nodes corresponding to headings and sub-headings and further comprising creating for each node a list of the records appropriate to that node.

15. The method recited in claim 14, wherein each list of records is stored as a bit string of length corresponding to the total number of records and with bits turned on or off according to whether the record corresponding to that bit is appropriate to the node or not.

16. The method recited in claim 15, wherein the determination of intersections is effected by successive logical AND operations on the bit strings for the nodes selected in the select table.

17. The method recited in claim 16, further comprising the step of qualifying the results of a query by one or more natural language queries that include exclusion qualifiers and/or size delimiters.

18. A computer system, comprising:

(a) a computer database comprising a plurality of records each of which is represented in a plurality of dimensions, each dimension comprising a range of possible values, the dimensions including headings denoting value sets in the range of possible values for the respective dimension; and (b) program means for interrogation of the database, comprising:

(i) means for generating a blank elementary select table and representations of a plurality of dimensions and displaying the same to a user;

(ii) means for reading input from the user who selects desired dimensions from said plurality of dimensions;

(iii) means for adding to said select table row and column headings that respectively correspond to user-selected dimensions so as to specify value sets; and (iv) means for filling empty cells in said select table with data derived from the intersection of the value sets defined by the respective row and column headings in the computer database, said empty cells defined by the intersections of row and columns corresponding to said row and column headings.

19. The computer system recited in claim 18, further comprising means for summing data from a plurality of records in accordance with the row and column headings and filling the empty cells with data indicative of the summations.

20. The computer system recited in claim 19, the headings and sub-headings for each particular row and each particular column are respectively aligned to define a row heading set intersection and a column heading set intersection and comprising executing a program which fills in said cells at the crossing of each said particular row and each said particular column with data corresponding to the set intersection of the row heading set intersection and the column heading set intersection.

21. The computer system recited in claim 20, further comprising means for defining nodes of each dimension corresponding to headings and sub-headings, and means for creating for each node a list of the records appropriate to that node.

22. The computer system recited in claim 21, further comprising means for storing each list of records as a bit string of length corresponding to the total number of records and with bits turned on or off according to whether the record corresponding to that bit is appropriate to the node.

23. The computer system recited in claim 22, further comprising means for performing logical AND operations on the bit strings for the nodes selected in the select table.

24. The computer system recited in claim 23, further comprising means for further processing the results of a query by one or more natural language queries.

25. A method of interrogating a computer database, the database having a number of records and a number of dimensions in which each of said records is represented, each dimension comprising a range of possible values, the dimensions including headings denoting value sets in the range of possible values for the respective dimension, the method comprising the steps of:

a) displaying a predetermined set of headings defining value sets of data in said database and a table consisting of at least rows and columns of cells;

b) allowing the user to select one or more of the headings for a search of said database;

c) allowing the user to select one or more of the rows for placing the headings selected in the step b) to specify row headings;

d) allowing the user to select one or more of the columns for placing the headings selected in the step b) to specify column headings; and e) retrieving relevant data specified by the value sets of the user-selected row headings and column headings from the database for display in the respective cells of the table.

* * * * *